(12) United States Patent
Fecant et al.

(10) Patent No.: US 12,678,764 B2
(45) Date of Patent: Jul. 14, 2026

(54) METHOD FOR CAPTURING MERCAPTANS USING A MACRO AND MESOPOROUS CAPTURE MASS

(71) Applicant: IFP ENERGIES NOUVELLES, Rueil-Malmaison (FR)

(72) Inventors: Antoine Fecant, Rueil-Malmaison Cedex (FR); Antoine Hugon, Rueil-Malmaison Cedex (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 174 days.

(21) Appl. No.: 18/720,507

(22) PCT Filed: Dec. 12, 2022

(86) PCT No.: PCT/EP2022/085352
§ 371 (c)(1),
(2) Date: Jun. 14, 2024

(87) PCT Pub. No.: WO2023/110730
PCT Pub. Date: Jun. 22, 2023

(65) Prior Publication Data
US 2025/0041822 A1 Feb. 6, 2025

(30) Foreign Application Priority Data

Dec. 17, 2021 (FR) ...................................... 2113811

(51) Int. Cl.
| | |
|---|---|
| *B01J 20/02* | (2006.01) |
| *B01J 20/28* | (2006.01) |
| *B01J 20/30* | (2006.01) |
| *B01J 20/32* | (2006.01) |
| *C10G 25/05* | (2006.01) |

(52) U.S. Cl.
CPC ..... *B01J 20/0225* (2013.01); *B01J 20/28061* (2013.01); *B01J 20/28071* (2013.01); *B01J 20/28073* (2013.01); *B01J 20/3078* (2013.01); *B01J 20/3204* (2013.01); *B01J 20/3236* (2013.01); *C10G 25/05* (2013.01); *C10G 2300/202* (2013.01); *C10G 2400/02* (2013.01)

(58) Field of Classification Search
CPC .............. B01J 20/0225; B01J 20/28061; B01J 20/28071; B01J 20/28073; B01J 20/3078; B01J 20/3204; B01J 20/3236; B01J 35/615; B01J 35/633; C10G 25/05; C10G 2300/202
See application file for complete search history.

(56) References Cited

U.S. PATENT DOCUMENTS

| | | | |
|---|---|---|---|
| 5,866,749 | A | 2/1999 | Ou |
| 6,579,444 | B2 | 6/2003 | Feimer et al. |
| 6,896,795 | B2 | 5/2005 | Didillon et al. |
| 6,972,086 | B2 | 12/2005 | Didillon et al. |
| 8,066,869 | B2 | 11/2011 | Nicolaos et al. |
| 2003/0188992 | A1 | 10/2003 | Halbert et al. |
| 2003/0226786 | A1 | 12/2003 | Feimer et al. |
| 2013/0327216 | A1* | 12/2013 | Deckman ............. B01D 53/047 96/113 |
| 2014/0013955 | A1* | 1/2014 | Tammera ............. B01J 20/3204 156/305 |
| 2014/0033919 | A1* | 2/2014 | Deckman ........... B01D 53/0473 95/100 |
| 2014/0060326 | A1* | 3/2014 | Sundaram .......... B01D 53/0446 95/143 |
| 2018/0015407 | A1* | 1/2018 | Vittenet ............. B01J 20/28057 |
| 2020/0087576 | A1* | 3/2020 | Marker ................... B01J 23/38 |
| 2023/0016535 | A1 | 1/2023 | Hugon et al. |
| 2025/0043198 | A1* | 2/2025 | Fecant ................... C10G 25/05 |
| 2025/0050305 | A1* | 2/2025 | Fecant .................... B01J 20/02 |

FOREIGN PATENT DOCUMENTS

| | | |
|---|---|---|
| CN | 109266387 B | 12/2020 |
| CN | 109420506 B | 7/2021 |
| WO | 2021122059 A1 | 6/2021 |

OTHER PUBLICATIONS

International Search report PCT/EP2022/085352 dated Feb. 20, 2023 (pp. 1-2).

* cited by examiner

*Primary Examiner* — Tam M Nguyen
(74) *Attorney, Agent, or Firm* — Csaba Henter; MILLEN, WHITE, ZELANO & BRANIGAN

(57) ABSTRACT

Process for trapping mercaptans contained in a sulfur-containing hydrocarbon feedstock, in the presence of a trapping mass comprising an active phase based on at least one group VIII, IB or IIB metal, and a mesoporous or macroporous support, said trapping mass comprising a specific surface area of between 120 m²/g and 350 m²/g, and:

the volume of mesopores with a diameter greater than or equal to 2 nm and less than 50 nm corresponds to between 40% and 70% by volume of the total pore volume of said trapping mass;

the volume of macropores with a diameter greater than or equal to 50 nm corresponds to between 30% and 60% by volume of the total pore volume of said trapping mass.

11 Claims, No Drawings

METHOD FOR CAPTURING MERCAPTANS USING A MACRO AND MESOPOROUS CAPTURE MASS

FIELD OF THE INVENTION

The present invention relates to the field of hydrotreating gasoline cuts, notably gasoline cuts resulting from fluidized-bed catalytic cracking units. More particularly, the present invention relates to a process for trapping mercaptan-type compounds contained in hydrocarbon feedstocks in the presence of a specific trapping mass.

PRIOR ART

Automotive fuel specifications call for a significant reduction in the sulfur content in these fuels, and notably in gasolines. This reduction is notably directed toward limiting the content of sulfur and nitrogen oxides in motor vehicle exhaust gases. The specifications currently in force in Europe since 2009 for gasoline fuels set a maximum content of 10 ppm (parts per million) by weight of sulfur. Such specifications are also in force in other countries, for instance the United States and China, where the same maximum sulfur content has been required since January 2017. To achieve these specifications, it is necessary to treat gasolines via desulfurization processes.

The main sources of sulfur in gasoline bases are "cracking" gasolines, and mainly the gasoline fraction obtained from a process of catalytic cracking of an atmospheric or vacuum distillation residue of a crude oil. The gasoline fraction from catalytic cracking, which represents on average 40% of gasoline bases, in fact accounts for more than 90% of the sulfur in gasolines. Consequently, the production of low-sulfur gasolines requires a step of desulfurization of the catalytic cracking gasolines. Among the other sources of gasolines that may contain sulfur, mention may also be made of coker gasolines, visbreaker gasolines or, to a lesser extent, gasolines obtained from atmospheric distillation or steam cracking gasolines.

The removal of sulfur from gasoline cuts consists in specifically treating these sulfur-rich gasolines via desulfurization processes in the presence of hydrogen. These are then referred to as hydrodesulfurization (HDS) processes. However, these gasoline cuts, and more particularly the catalytic cracking (FCC) gasolines, contain a large proportion of unsaturated compounds in the form of monoolefins (about 20% to 50% by weight) which contribute toward a good octane number, diolefins (0.5% to 5% by weight) and aromatics. These unsaturated compounds are unstable and react during the hydrodesulfurization treatment. Diolefins form gums by polymerization during the hydrodesulfurization treatments. This gum formation leads to gradual deactivation of the hydrodesulfurization catalysts or gradual clogging of the reactor. Consequently, the diolefins must be removed by hydrogenation before any treatment of these gasolines. Conventional treatment processes desulfurize gasolines non-selectively by hydrogenating a large portion of the monoolefins, giving rise to a high loss of octane number and high hydrogen consumption. The most recent hydrodesulfurization processes make it possible to desulfurize cracking gasolines rich in monoolefins, while limiting the hydrogenation of the monoolefins and consequently the loss of octane. Such processes are described, for example, in documents EP-A-1077247 and EP-A-1174485.

However, when very deep desulfurization of cracking gasolines needs to be performed, some of the olefins present in the cracking gasolines are hydrogenated, on the one hand, and recombine with $H_2S$ to form mercaptans, on the other hand. This family of compounds, of chemical formula R—SH where R is an alkyl group, are generally called recombination mercaptans, and generally represent between 20% by weight and 80% by weight of the residual sulfur in desulfurized gasolines. Reduction of the content of recombination mercaptans may be achieved by catalytic hydrodesulfurization, but this leads to the hydrogenation of a large portion of the monoolefins present in the gasoline, which then leads to a large reduction in the octane number of the gasoline and also to an overconsumption of hydrogen. It is moreover known that the loss of octane due to the hydrogenation of the monoolefins during the hydrodesulfurization step is proportionately greater the lower the targeted sulfur content, i.e. when it is sought to thoroughly remove the sulfur compounds present in the feedstock.

For these reasons, it is thus preferable to treat this partially hydrodesulfurized gasoline via a judiciously chosen adsorption technique which will make it possible simultaneously to remove the sulfur compounds initially present in the cracking gasolines and not converted and the recombination mercaptans, without hydrogenating the monoolefins present, so as to preserve the octane number.

Various solutions are proposed in the literature for extracting these mercaptans from hydrocarbon fractions using adsorption type processes or by combining hydrodesulfurization or adsorption steps. However, there is still a need for more efficient trapping masses for the extraction of mercaptans for the purpose of limiting the hydrogenation reactions responsible in this context for reducing the octane number of the gasolines concerned.

For example, patent application US 2003/0188992 describes how to desulfurize olefinic gasolines by treating the gasoline in a first hydrodesulfurization step and then removing mercaptan-type sulfur compounds in a polishing step. This polishing step mainly consists of solvent extraction of the mercaptans by scrubbing.

U.S. Pat. No. 5,866,749 proposes a solution for removing the elemental sulfur and mercaptans contained in an olefinic cut by passing the mixture to be treated over a reduced metal chosen from groups IB, IIB and IIIA of the Periodic Table and performed at a temperature below 37° C.

U.S. Pat. No. 6,579,444 presents a process for removing sulfur present in gasolines or the residual sulfur present in partially desulfurized gasolines based on the use of a solid containing cobalt and a group VI metal.

Patent application US 2003/0226786 presents a process for desulfurizing gasoline by adsorption and also methods for regenerating the adsorbent. The adsorbent considered is any hydrotreating catalyst and more particularly the solids containing a group VIII metal alone or mixed with a group VI metal, and containing between 2% and 20% by weight of group VIII metal.

Patent FR2908781 discloses a process for trapping sulfur compounds from a partially desulfurized hydrocarbon feedstock in the presence of an adsorbent comprising at least one group VIII, IB, IIB or IVA metal, the adsorbent being used in reduced form in the absence of hydrogen and at a temperature above 40° C.

The applicant has surprisingly discovered that it is possible to improve the performance in a mercaptan trapping process by using a trapping mass which is both mesoporous and macroporous, coupled with a high specific surface area, making it possible to significantly increase the mercaptan retention capacity. Without wishing to be bound to any theory, the synergistic effect between the high specific surface area and the particular pore distribution of the trapping mass makes it possible on the one hand to ensure good dispersion of the metallic element within said trapping mass, and on the other hand to reduce the phenomena of limitation of the transfer of the sulfur-containing compounds to be trapped.

Subjects of the Invention

The present invention relates to a process for trapping mercaptans contained in a sulfur-containing hydrocarbon feedstock which is optionally partially desulfurized, resulting from a step of catalytic hydrodesulfurization, at a temperature of between 40° C. and 250° C., a pressure of between 0.2 MPa and 5 MPa, at an hourly space velocity, defined as the volume flow rate of feedstock at the inlet per volume of trapping mass, of between 0.1 h$^{-1}$ and 50 h$^{-1}$, in the presence of a trapping mass comprising an active phase based on at least one group VIII, IB or IIB metal, and a mesoporous or macroporous support, said support being selected from the group consisting of alumina, silica, silica-alumina, and clays, said trapping mass comprising a specific surface area of between 120 m$^2$/g and 350 m$^2$/g, and:

the volume of mesopores with a diameter greater than or equal to 2 nm and less than 50 nm corresponds to between 40% and 70% by volume of the total pore volume of said trapping mass;

the volume of macropores with a diameter greater than or equal to 50 nm corresponds to between 30% and 60% by volume of the total pore volume of said trapping mass.

According to one or more embodiments, said trapping mass comprises a specific surface area of between 150 m$^2$/g and 300 m$^2$/g.

According to one or more embodiments, the volume of mesopores with a diameter greater than or equal to 2 nm and less than 50 nm corresponds to between 45% and 65% by volume of the total pore volume of said trapping mass.

According to one or more embodiments, the volume of macropores with a diameter greater than or equal to 50 nm corresponds to between 35% and 55% by volume of the total pore volume of said trapping mass.

According to one or more embodiments, the content of group VIII, IB or IIB element is between 10% and 80% by weight relative to the total weight of the trapping mass.

According to one or more embodiments, said group VIII, IB or IB metal is chosen from nickel, copper or zinc.

According to one or more embodiments, said metal is nickel.

According to one or more embodiments, the content of aluminum and/or silicon elements in said trapping mass is between 5% and 45% by weight relative to the total weight of the trapping mass.

According to one or more embodiments, said trapping mass has a total pore volume, measured by mercury porosimetry, of between 0.1 ml/g and 0.7 ml/g.

According to one or more embodiments, said hydrocarbon feedstock is a feedstock that has been partially desulfurized by a catalytic hydrodesulfurization step.

According to one or more embodiments, said hydrocarbon feedstock to be treated is a partially desulfurized catalytic cracking gasoline having a boiling point below 350° C. and containing between 5% and 60% by weight of olefins and less than 100 ppm by weight of sulfur relative to the total weight of said feedstock.

DETAILED DESCRIPTION OF THE INVENTION

Definitions

Subsequently, the groups of chemical elements are given according to the CAS classification (CRC Handbook of Chemistry and Physics, published by CRC Press, editor-in-chief D. R. Lide, 81$^{st}$ edition, 2000-2001). For example, group VIII according to the CAS classification corresponds to the metals of columns 8, 9 and 10 according to the new IUPAC classification.

The BET specific surface area is measured by nitrogen physisorption according to the standard ASTM D3663-03, a method described in the work by Rouquerol F., Rouquerol J. and Singh K., "*Adsorption by Powders & Porous Solids: Principles, Methodology and Applications*", Academic Press, 1999.

In the present description, according to the IUPAC convention, "micropores" are understood to mean the pores having a diameter of less than 2 nm, i.e. 0.002 μm; "mesopores" are understood to mean the pores having a diameter of greater than 2 nm, i.e. 0.002 μm, and less than 50 nm, i.e. 0.05 μm, and "macropores" are understood to mean the pores having a diameter of greater than or equal to 50 nm, i.e. 0.05 μm.

In the following description of the invention, the "total pore volume" (TPV) of the trapping mass or of the support is understood to mean the volume measured by mercury intrusion porosimetry according to the standard ASTM D4284-83 at a maximum pressure of 4000 bar (400 MPa), using a surface tension of 484 dyne/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-5, written by Jean Charpin and Bernard Rasneur.

In order to obtain better accuracy, the value of the total pore volume in ml/g that is given in the text which follows corresponds to the value of the total mercury volume (total pore volume measured by mercury intrusion porosimetry) in ml/g measured on the sample minus the value of the mercury volume in ml/g measured on the same sample for a pressure corresponding to 30 psi (approximately 0.2 MPa).

The volume of the macropores and of the mesopores is measured by mercury intrusion porosimetry according to the standard ASTM D4284-83 at a maximum pressure of 4000 bar (400 MPa), using a surface tension of 484 dyne/cm and a contact angle of 140°. The value from which the mercury fills all the intergranular voids is set at 0.2 MPa and it is considered that, above this value, the mercury penetrates into the pores of the sample.

The macropore volume of the trapping mass or of the support is defined as being the cumulative volume of mercury introduced at a pressure of between 0.2 MPa and 30 MPa, corresponding to the volume contained in the pores having an apparent diameter of greater than 50 nm.

The mesopore volume f the trapping mass or of the support is defined as being the cumulative volume of mercury introduced at a pressure of between 30 MPa and 400 MPa, corresponding to the volume contained in the pores having an apparent diameter of greater than 2 nm and less than 50 nm.

When the incremental pore volume measured by mercury porosimetry is plotted as a function of the pore diameter, the porosity modes correspond to the inflection points of the function represented.

The contents of metallic elements (group VIII, IB or IIB metals) are measured by X-ray fluorescence.

Trapping of Mercaptans

The invention relates to a process for trapping mercaptans contained in a sulfur-containing hydrocarbon feedstock, said feedstock advantageously having been partially desulfurized by a catalytic hydrodesulfurization step, in the presence of a trapping mass.

The mercaptan trapping process is generally carried out at a temperature of between 40° C. and 250° C., preferably between 100° C. and 250° C., preferably between 130° C. and 240° C.

Said process is generally performed at an hourly space velocity (which is defined as the volume flow rate of feedstock at the inlet per volume of trapping mass) of between 0.1 h$^{-1}$ and 50 h$^{-1}$, preferably between 0.5 h$^{-1}$ and 20 h$^{-1}$, preferably between 0.5 h$^{-1}$ and 10 h$^{-1}$.

Said mercaptan trapping process is generally carried out in the absence of hydrogen. The feedstock must preferably remain liquid, which requires sufficient pressure greater than the vaporization pressure of the feedstock. Said mercaptan trapping process is generally performed at a pressure of between 0.2 MPa and 5 MPa, preferably between 0.2 MPa and 2 MPa.

Advantageously, the reaction section of the trapping process comprises between two and five reactors, which operate in permutable mode, referred to by the term PRS for permutable reactor system or by the term "lead and lag".

The sulfur-containing hydrocarbon feedstock, which is optionally partially desulfurized, is preferably a gasoline containing olefinic compounds, preferably a gasoline cut obtained from a catalytic cracking process. The treated hydrocarbon feedstock generally has a boiling point below 350° C., preferably below 300° C. and very preferably below 250° C. Preferably, the feedstock contains between 5% and 60% by weight of olefins relative to the total weight of said feedstock. Preferably, the hydrocarbon feedstock contains less than 100 ppm by weight of sulfur and preferably less than 50 ppm by weight of sulfur relative to the total weight of said feedstock. Preferably, the partially desulfurized hydrocarbon feedstock contains less than 50 ppm by weight of sulfur in the form of mercaptans, relative to the total weight of the feedstock, preferably less than 30 ppm by weight of sulfur in the form of mercaptans.

Preferably, the feedstock to be treated undergoes a partial desulfurization treatment before the mercaptan trapping process: the step consisting in bringing the sulfur-containing feedstock fraction into contact with hydrogen, in one or more hydrodesulfurization reactors in series, containing one or more catalysts suitable for performing the hydrodesulfurization. Preferably, the operating pressure of this step is generally between 0.5 MPa and 5 MPa, and very preferably between 1 MPa and 3 MPa, and the temperature is generally between 200° C. and 400° C., and very preferably between 220° C. and 380° C. Preferably, the amount of catalyst used in each reactor is generally such that the ratio between the flow rate of gasoline to be treated, expressed in m$^3$ per hour under standard conditions, per m$^3$ of catalyst is between 0.5 h$^{-1}$ and 20 h$^{-1}$, and very preferably between 1 h$^{-1}$ and 10 h$^{-1}$. Preferably, the hydrogen flow rate is generally such that the ratio between the hydrogen flow rate expressed in normal m$^3$ per hour (Nm$^3$/h) and the flow rate of feedstock to be treated expressed in m$^3$ per hour under standard conditions is between 50 Nm$^3$/m$^3$ and 1000 Nm$^3$/m$^3$, very preferably between 70 Nm$^3$/m$^3$ and 800 Nm$^3$/m$^3$. Preferably, this step will be carried out for the purpose of performing hydrodesulfurization selectively, i.e. with a degree of hydrogenation of the monoolefins of less than 80% by weight, preferably less than 70% by weight and very preferably less than 60% by weight.

The degree of desulfurization achieved during this hydrodesulfurization step is generally greater than 50% and preferably greater than 70%, such that the hydrocarbon fraction used in the mercaptan trapping process contains less than 100 ppm by weight of sulfur and preferably less than 50 ppm by weight of sulfur.

Any hydrodesulfurization catalyst may be used in the preliminary hydrodesulfurization step. Preferably, use is made of catalysts which have high selectivity with respect to the hydrodesulfurization reactions, in comparison with the olefin hydrogenation reactions. Such catalysts comprise at least one porous inorganic support, a group VIB metal, a group VIII metal. The group VIB metal is preferentially molybdenum or tungsten and the group VIII metal is preferentially nickel or cobalt. The support is generally selected from the group constituted by aluminas, silica, silica-aluminas, silicon carbide, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Preferably, the hydrodesulfurization catalyst used in the additional hydrodesulfurization step(s) has the following features:

the content of group VIB elements is between 1% and 20% by weight of oxides of group VIB elements relative to the weight of the catalyst;

the content of group VIII elements is between 0.1% and 20% by weight of oxides of group VIII elements relative to the weight of the catalyst;

the (group VIII elements/group VIB elements) molar ratio is between 0.1 and 0.8.

When the metal is cobalt or nickel, the metal content is expressed as CoO and NiO respectively. When the metal is molybdenum or tungsten, the metal content is expressed as MoO$_3$ and WO$_3$ respectively.

A very preferred hydrodesulfurization catalyst comprises cobalt and molybdenum and has the abovementioned features. Furthermore, the hydrodesulfurization catalyst may comprise phosphorus. In this case, the phosphorus content is preferably between 0.1% and 10% by weight of P$_2$O$_5$, relative to the total weight of catalyst, and the molar ratio of phosphorus to group VIB elements is greater than or equal to 0.25, preferably greater than or equal to 0.27.

Preferably, the feedstock to be treated undergoes a complementary polishing hydrodesulfurization treatment after the partial desulfurization treatment and before the mercaptan trapping process. The polishing hydrodesulfurization step is mainly carried out in order to at least partly decompose the recombination mercaptans formed during the partial desulfurization treatment into olefins and H$_2$S, but it also makes it possible to hydrodesulfurize the more refractory sulfur compounds whereas the first hydrodesulfurization step is mainly carried out in order to convert a large portion of the sulfur compounds into H$_2$S. The remaining sulfur compounds are essentially refractory sulfur compounds and the recombination mercaptans resulting from the addition of the H$_2$S formed.

The polishing hydrodesulfurization process is generally carried out at a temperature of between 280° C. and 400° C., preferably between 300° C. and 380° C., preferably between 310° C. and 370° C. The temperature of this polishing step is generally at least 5° C., preferably at least 10° C. and very preferably at least 20° C. higher than the temperature of the first hydrodesulfurization step. The process is generally carried out at an hourly space velocity (which is defined as the volume flow rate of feedstock at the inlet per volume of catalyst) of between 0.5 h$^{-1}$ and 20 h$^{-1}$, preferably between 1 h$^{-1}$ and 10 h$^{-1}$. The process is generally carried out at with a hydrogen flow rate such that the ratio between the hydrogen flow rate expressed in normal m$^3$ per hour (Nm$^3$/h) and the flow rate of feedstock to be treated expressed in m$^3$ per hour under standard conditions is between 10 Nm$^3$/m$^3$ and 1000 Nm$^3$/m$^3$, preferably between 20 Nm$^3$/m$^3$ and 800 Nm$^3$/m$^3$.

The process is generally carried out at a pressure of between 0.5 MPa and 5 MPa, preferably between 1 MPa and 3 MPa.

Any hydrodesulfurization catalyst may be used in the polishing hydrodesulfurization step. Preferably, the catalyst comprises at least one porous inorganic support and a group VIII metal. The group VIII metal is preferentially nickel. The support is generally selected from the group constituted by aluminas, silica, silica-aluminas, silicon carbide, titanium oxides, alone or as a mixture with alumina or silica-alumina, and magnesium oxides, alone or as a mixture with alumina or silica-alumina. Preferably, the support is selected from the group constituted by aluminas, silica and silica-aluminas. Preferably, the hydrodesulfurization catalyst used in the polishing hydrodesulfurization step has the following features:

the content of group VIII elements is between 0.1% and 30% by weight of oxides of group VIII elements relative to the weight of the catalyst;
the support used is an alumina-based support.

Preferably, the hydrocarbon feedstock after polishing hydrodesulfurization treatment contains less than 100 ppm by weight of sulfur derived from organic compounds and preferably less than 50 ppm by weight of sulfur derived from organic compounds, especially in the form of mercaptans and refractory sulfur compounds.

At the end of the hydrodesulfurization step, the effluent undergoes a step of separation of hydrogen and H$_2$S via any method known to those skilled in the art (disengager, stabilization column, etc.), so as to recover a liquid effluent such that the dissolved H$_2$S represents at most 30% by weight, or even 20% by weight, or even 10% by weight of the total sulfur present in the hydrocarbon fraction to be treated downstream by the mercaptan trapping process.

Trapping Mass

Said trapping mass used in the context of the process according to the invention comprises an active phase based on at least one group VIII, IB or IIB metal, and a mesoporous or macroporous support, said support being selected from the group consisting of alumina, silica, silica-alumina and clays, said trapping mass comprising a specific surface area of between 120 m$^2$/g and 350 m$^2$/g, and:

the volume of mesopores with a diameter greater than or equal to 2 nm and less than 50 nm corresponds to between 40% and 70% by volume of the total pore volume of said trapping mass;
the volume of macropores with a diameter greater than or equal to 50 nm corresponds to between 30% and 60% by volume of the total pore volume of said trapping mass.

The content of group VIII, IB or IIB element is preferably between 10% and 80% by weight relative to the total weight of the trapping mass, preferably between 20% and 70% by weight, very preferably between 30% and 70% by weight.

Preferably, said group VIII, IB or IIB metal is chosen from nickel, copper or zinc. Very preferably, said metal is nickel.

Said trapping mass also comprises a support selected from the group consisting of aluminas, silica, silica-aluminas and clays. The content of aluminum and/or silicon elements in said trapping mass is preferably between 5% and 45% by weight relative to the total weight of the trapping mass, very preferably between 5% and 30% by weight.

According to one variant, said trapping mass used according to the invention may comprise at least one group IA or IIA element, preferably sodium or calcium. When said trapping mass comprises at least one group IA or IIA element, the content thereof is preferably between 0.01% and 5% by weight relative to the total weight of the trapping mass, very preferably between 0.02% and 2% by weight.

The trapping mass used according to the present invention has a specific surface area of between 120 m$^2$/g and 350 m$^2$/g, preferably between 150 m$^2$/g and 300 m$^2$/g, more preferentially between 175 m$^2$/g and 270 m$^2$/g.

The trapping mass used according to the invention preferably has a total pore volume measured by mercury porosimetry of between 0.1 ml/g and 0.7 ml/g, preferably of between 0.2 ml/g and 0.6 ml/g.

According to the invention, the volume of mesopores with a diameter greater than or equal to 2 nm and less than 50 nm corresponds to between 40% and 70% by volume of the total pore volume of said trapping mass, preferably between 45% and 65%.

According to the invention, the volume of macropores with a diameter greater than or equal to 50 nm corresponds to between 30% and 60% by volume of the total pore volume of said trapping mass, preferably between 35% and 55%.

Said trapping mass used according to the invention is advantageously in the form of grains having a mean diameter of between 0.5 and 10 mm. The grains may have any shape known to those skilled in the art, for example the shape of beads (preferably having a diameter of between 1 and 6 mm), extrudates, tablets or hollow cylinders. Preferably, the trapping mass is either in the form of extrudates with a mean diameter of between 0.5 and 10 mm, preferably between 0.8 and 3.2 mm, or in the form of beads with a mean diameter of between 0.5 and 10 mm, preferably between 1.4 and 4 mm. The term "mean diameter" of the extrudates is understood to mean the mean diameter of the circle circumscribed in the cross section of these extrudates.

The trapping mass used in the context of the process according to the invention can be prepared according to any method known to those skilled in the art. By way of example, mention may be made of the methods of dry impregnation of an active phase precursor on a shaped porous inorganic support, or that of co-kneading precursors of active phase and structuring phase and then shaping.

Advantageously, the trapping mass undergoes an activation step so that the active phase is at least partially reduced. This treatment makes it possible to form metal particles of the group VIII, IB or IIB elements in the zero-valent state. The reducing gas is preferably hydrogen. The hydrogen may be used pure or as a mixture (for example a hydrogen/nitrogen, hydrogen/argon or hydrogen/methane mixture). In the case where the hydrogen is used as a mixture, any proportion may be envisaged. Said reducing treatment is preferentially performed at a temperature of between 100 and 500° C., preferably between 100 and 450° C. The duration of the reducing treatment is generally between 1 and 40 hours, preferably between 1 and 24 hours. The rise in temperature up to the desired reduction temperature is generally slow, for example set between 0.1 and 10° C./min, preferably between 0.3 and 7° C./min. In the case where the step of activating the trapping mass is carried out ex situ, that is to say outside the reactor of the mercaptan trapping process according to the invention, it is advantageous to carry out a passivation step in order to protect the trapping mass. This passivation step can be carried out in the presence of an oxidizing gas according to any method known to those skilled in the art. After the passivation step, a final activation step is advantageously carried out in situ, that is to say in the reactor of the mercaptan trapping process according to the invention, under a stream of reducing gas such as hydrogen or under a stream of feedstock to be treated, at a temperature between 100° C. and 300° C., preferably between 100° C. and 250° C.

The invention is illustrated by the examples that follow without limiting the scope thereof.

EXAMPLES

Example 1: Trapping Mass A (not in Accordance with the Invention)

An alumina support (sold by Axens®) is provided in the form of beads with a diameter of between 1.4 and 4 mm, having a specific surface area of 70 m²/g and a pore volume of 0.63 ml/g, such that:

63% of the total pore volume of the pores has a pore diameter greater than or equal to 2 nm and less than 50 nm, 37% of the total pore volume of the pores has a pore diameter greater than or equal to 50 nm.

An aqueous nickel nitrate solution containing 14% by weight of Ni (Parchem®) is also provided.

The trapping mass A is prepared by dry impregnation of 50 grams of the alumina support with 25.6 ml of the aqueous nickel nitrate solution, followed by drying in air at 120° C. for 12 hours followed by calcining at 450° C. for 6 hours. The operation of dry impregnation followed by heat treatments is repeated 5 times on the recovered solid.

The trapping mass A comprises 34.5% by weight of nickel and 28.7% by weight of aluminum relative to the total weight of the solid. It has a specific surface area of 57 m²/g, a total pore volume of 0.35 ml/g such that:

50% of the total pore volume of the pores has a pore diameter greater than or equal to 2 nm and less than 50 nm, 50% of the total pore volume of the pores has a pore diameter greater than or equal to 50 nm.

Example 2: Trapping Mass B (not in Accordance with the Invention)

An alumina support is provided in extrudate form (sold by Axens®) with a diameter of 1.6 mm, having a specific surface area of 213 m²/g and a pore volume of 0.53 ml/g such that:

100% of the total pore volume of the pores has a pore diameter greater than or equal to 2 nm and less than 50 nm, 0% of the total pore volume of the pores has a pore diameter greater than or equal to 50 nm.

An aqueous nickel nitrate solution containing 14% by weight of Ni (Parchem®) is also provided.

The trapping mass B is prepared by dry impregnation of 50 grams of the alumina support with 21.9 ml of the aqueous nickel nitrate solution, followed by drying in air at 120° C. for 12 hours followed by calcining at 450° C. for 6 hours.

The operation of dry impregnation followed by heat treatments is repeated 6 times on the recovered solid.

The trapping mass B comprises 35.1% by weight of nickel and 27.9% by weight of aluminum relative to the total weight of the solid. It has a specific surface area of 174 m²/g, a total pore volume of 0.29 ml/g such that:

100% of the total pore volume of the pores has a pore diameter greater than or equal to 2 nm and less than 50 nm, 0% of the total pore volume of the pores has a pore diameter greater than or equal to 50 nm.

Example 3: Trapping Mass C (not in Accordance with the Invention)

An alumina support is provided in extrudate form (sold by Axens®) with a diameter of 1.6 mm, having a specific surface area of 78 m²/g and a pore volume of 0.78 ml/g such that:

100% of the total pore volume of the pores has a pore diameter greater than or equal to 2 nm and less than 50 nm, 0% of the total pore volume of the pores has a pore diameter greater than or equal to 50 nm.

An aqueous nickel nitrate solution containing 14% by weight of Ni (Parchem®) is also provided.

The trapping mass C is prepared by dry impregnation of 50 grams of the alumina support with 30.7 ml of the aqueous nickel nitrate solution, followed by drying in air at 120° C. for 12 hours followed by calcining at 450° C. for 6 hours. The operation of dry impregnation followed by heat treatments is repeated 4 times on the recovered solid.

The trapping mass C comprises 35.0% by weight of nickel and 28.9% by weight of aluminum relative to the total weight of the solid. It has a specific surface area of 64 m²/g, a total pore volume of 0.43 ml/g such that:

100% of the total pore volume of the pores has a pore diameter greater than or equal to 2 nm and less than 50 nm, 0% of the total pore volume of the pores has a pore diameter greater than or equal to 50 nm.

Example 4: Trapping Mass D (not in Accordance with the Invention)

An alumina support is provided in the form of beads (sold by Axens®) with a diameter of between 1.4 and 4 mm, having a specific surface area of 11 m²/g and a total pore volume of 0.53 ml/g such that:

2% of the total pore volume of the pores has a pore diameter greater than or equal to 2 nm and less than 50 nm, 98% of the total pore volume of the pores has a pore diameter greater than or equal to 50 nm.

An aqueous nickel nitrate solution containing 14% by weight of Ni (Parchem®) is also provided.

The trapping mass D is prepared by dry impregnation of 50 grams of the alumina support with 21.9 ml of the aqueous nickel nitrate solution, followed by drying in air at 120° C. for 12 hours followed by calcining at 450° C. for 6 hours. The operation of dry impregnation followed by heat treatments is repeated 6 times on the recovered solid.

The trapping mass D comprises 35.1% by weight of nickel and 28.5% by weight of aluminum relative to the total weight of the solid. It has a specific surface area of 8 m²/g, a total pore volume of 0.29 ml/g such that:

1% of the total pore volume of the pores has a pore diameter greater than or equal to 2 nm and less than 50 nm, 99% of the total pore volume of the pores has a pore diameter greater than or equal to 50 nm.

Example 5: Trapping Mass E (in Accordance with the Invention)

An alumina support is provided in the form of beads (sold by Axens®) with a diameter of between 1.4 and 4 mm, having a specific surface area of 264 m²/g and a total pore volume of 0.49 ml/g such that:

65% of the total pore volume of the pores has a pore diameter greater than or equal to 2 nm and less than 50 nm, 35% of the total pore volume of the pores has a pore diameter greater than or equal to 50 nm.

An aqueous nickel nitrate solution containing 14% by weight of Ni (Parchem®) is also provided.

The trapping mass E is prepared by dry impregnation of 50 grams of the alumina support with 21.9 ml of the aqueous nickel nitrate solution, followed by drying in air at 120° C. for 12 hours followed by calcining at 450° C. for 6 hours. The operation of dry impregnation followed by heat treatments is repeated 4 times on the recovered solid.

The trapping mass E comprises 34.8% by weight of nickel and 27.3% by weight of aluminum relative to the total weight of the solid. It has a specific surface area of 217 m²/g, a total pore volume of 0.28 ml/g such that:

55% of the total pore volume of the pores has a pore diameter greater than or equal to 2 nm and less than 50 nm, 45% of the total pore volume of the pores has a pore diameter greater than or equal to 50 nm.

Example 6: Trapping Mass F (in Accordance with the Invention)

A silica-alumina support is provided in the form of extrudates (sold by Sasol®) with a diameter of 1.6 mm, having a specific surface area of 317 m²/g and a total pore volume of 0.71 ml/g such that:

79% of the total pore volume of the pores has a pore diameter greater than or equal to 2 nm and less than 50 nm, 21% of the total pore volume of the pores has a pore diameter greater than or equal to 50 nm.

An aqueous nickel nitrate solution containing 14% by weight of Ni (Parchem®) is also provided.

The trapping mass F is prepared by dry impregnation of 50 grams of the silica-alumina support with 30.7 ml of the aqueous nickel nitrate solution, followed by drying in air at 120° C. for 12 hours followed by calcining at 450° C. for 6 hours. The operation of dry impregnation followed by heat treatments is repeated 4 times on the recovered solid.

The trapping mass F comprises 35.0% by weight of nickel and 19.0% by weight of aluminum and 6.5% by weight of silica relative to the total weight of the solid. It has a specific surface area of 260 m²/g, a total pore volume of 0.39 ml/g such that:

61% of the total pore volume of the pores has a pore diameter greater than or equal to 2 nm and less than 50 nm, 39% of the total pore volume of the pores has a pore diameter greater than or equal to 50 nm.

Example 7: Evaluation of the Performance of the Trapping Masses with Regard to the Trapping of Mercaptans The evaluation of the performance of masses A, B, C, D, E and F is performed by monitoring the performance for the dynamic trapping of hexanethiol in a hydrocarbon matrix. 10 ml of the solid tested are introduced beforehand into a test column 1 cm in diameter. The solid is reactivated in situ under a stream of 10 l/h of hydrogen at 400° C. for 2 hours. A hydrocarbon matrix referred to as feedstock is prepared beforehand by mixing heptane, 1-hexene and 1-hexanethiol, so as to obtain a matrix containing 2000 ppm by weight of sulfur and 10% by weight of olefin. The column containing the solid is then placed under a stream of heptane at an hourly space velocity of 8 h⁻¹ (80 ml of feedstock per hour per 10 ml of solid), at 200° C. and under a pressure of 1.7 MPa. The experiment begins when the heptane stream is replaced with a feedstock stream at an hourly space velocity of 8 h⁻¹, at 200° C. and under a pressure of 1.7 MPa. The effluents leaving the column are analyzed so as to determine the sulfur concentration of the treated matrix.

The dynamic performance of the solid corresponds to the amount of sulfur retained by the solid when the concentration of the effluents corresponds to one tenth of the sulfur concentration of the feedstock. The results are collated in Table 1 below.

TABLE 1

| Trapping mass | A (not in accordance with the invention) | B (not in accordance with the invention) | C (not in accordance with the invention) | D (not in accordance with the invention) | E (in accordance with the invention) | F (in accordance with the invention) |
|---|---|---|---|---|---|---|
| Ni content (wt %) | 34.5 | 35.1 | 35 | 35.1 | 34.8 | 35 |
| $S_{BET}$ (m²/g) | 57 | 174 | 64 | 8 | 217 | 260 |
| TPV (ml · g⁻¹) | 0.35 | 0.29 | 0.43 | 0.29 | 0.28 | 0.39 |
| $V_{mesopore}$ 2-50 nm (% TPV) | 50 | 100 | 100 | 1 | 55 | 61 |
| $V_{macropore}$ > 50 nm (% TPV) | 50 | 0 | 0 | 99 | 45 | 39 |
| Dynamic performance (g of sulfur retained) | 0.66 | 0.75 | 0.71 | 0.52 | 0.91 | 0.93 |

Only the trapping masses E and F in accordance with the invention, which combine a high specific surface area and a particular mesopore and macropore distribution, exhibit high performance in trapping hexanethiol in an olefinic hydrocarbon matrix compared with the trapping masses A to D which are not in accordance with the invention.

The invention claimed is:

1. A process for trapping mercaptans contained in a sulfur-containing hydrocarbon feedstock, at a temperature of between 40° C. and 250° C., a pressure of between 0.2 MPa and 5 MPa, at an hourly space velocity, defined as the volume flow rate of feedstock at the inlet per volume of trapping mass, of between $0.1 \, h^{-1}$ and $50 \, h^{-1}$, in the presence of a trapping mass comprising an active phase based on at least one group VIII, IB or IIB metal, and a support, said support being selected from the group consisting of alumina, silica, silica-alumina, and clays, said trapping mass having a specific surface area of between $120 \, m^2/g$ and $350 \, m^2/g$, and wherein the traping mass is both mesoporous and macroporous, and wherein:

the volume of mesopores with a diameter greater than or equal to 2 nm and less than 50 nm corresponds to between 40% and 70% by volume of the total pore volume of said trapping mass;

the volume of macropores with a diameter greater than or equal to 50 nm corresponds to between 30% and 60% by volume of the total pore volume of said trapping mass.

2. The process as claimed in claim 1, wherein said trapping mass has a specific surface area of between 150 $m^2/g$ and 300 $m^2/g$.

3. The process as claimed in claim 1, wherein the volume of mesopores with a diameter greater than or equal to 2 nm and less than 50 nm corresponds to between 45% and 65% by volume of the total pore volume of said trapping mass.

4. The process as claimed in claim 1, wherein the volume of macropores with a diameter greater than or equal to 50 nm corresponds to between 35% and 55% by volume of the total pore volume of said trapping mass.

5. The process as claimed in claim 1, wherein the content of group VIII, IB or IIB element is from 10% to 80% by weight relative to the total weight of the trapping mass.

6. The process as claimed in claim 1, wherein said group VIII, IB or IIB metal is nickel, copper or zinc.

7. The process as claimed in claim 6, wherein said metal is nickel.

8. The process as claimed in claim 1, wherein the content of aluminum and/or silicon elements in said trapping mass is between 5% and 45% by weight relative to the total weight of the trapping mass.

9. The process as claimed in claim 1, wherein said trapping mass has a total pore volume, measured by mercury porosimetry, of between 0.1 ml/g and 0.7 ml/g.

10. The process as claimed in claim 1, wherein said hydrocarbon feedstock is a feedstock that has been partially desulfurized by a catalytic hydrodesulfurization step.

11. The process as claimed in claim 10, wherein said hydrocarbon feedstock is a partially desulfurized catalytic cracking gasoline having a boiling point below 350° C. and containing between 5% and 60% by weight of olefins and less than 100 ppm by weight of sulfur relative to the total weight of said feedstock.

* * * * *